(12) United States Patent
Lindblad et al.

(10) Patent No.: US 8,385,519 B2
(45) Date of Patent: Feb. 26, 2013

(54) METHODS AND ARRANGEMENTS IN A CLIENT AND TELEPHONY SERVER

(75) Inventors: Ingemar Lindblad, Hagersten (SE); Stefan Avesand, Huddinge (SE); Arash Beygzadeh, Taby (SE); Torbjorn Dahlen, Uppsala (SE); Lennart Hellstrom, Skondal (SE); Klas Christer Olof Lundin, Varmdo (SE); Christian Thomas Ola Olrog, Stockholm (SE); Tomas Ravin, Stockholm (SE); Urban Theander, Tyreso (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 654 days.

(21) Appl. No.: 12/664,100

(22) PCT Filed: Jun. 18, 2007

(86) PCT No.: PCT/EP2007/056024
§ 371 (c)(1),
(2), (4) Date: Dec. 11, 2009

(87) PCT Pub. No.: WO2008/154953
PCT Pub. Date: Dec. 24, 2008

(65) Prior Publication Data
US 2010/0183129 A1    Jul. 22, 2010

(51) Int. Cl.
*H04M 11/00* (2006.01)
(52) U.S. Cl. .................. 379/93.01; 379/88.17; 709/217; 709/227; 370/401
(58) Field of Classification Search ............. 709/217, 709/227; 370/401; 725/29; 379/88.17, 93.01
See application file for complete search history.

(56) References Cited

U.S. PATENT DOCUMENTS

| 2002/0035597 A1 | 3/2002 | Khodko et al. |
| 2009/0193451 A1* | 7/2009 | O'Neil ............................ 725/29 |

OTHER PUBLICATIONS

J. Rosenberg, "A Framework for Application Interaction in the Session Initiation Protocol (SIP)", Cisco Systems, Jul. 18, 2005, pp. 1-39.
J. Rosenberg, "Request Authorization through Dialog Identification in the Session Initiation Protocol (SIP)", Cisco Systems, Dec. 19, 2005, pp. 1-17.
R. Sparks, "The Session Initiation Protocol (SIP) Refer Method", Dynamicsoft, Apr. 2003, pp. 1-24.

*Primary Examiner* — Gerald Gauthier
*Assistant Examiner* — Simon King
(74) *Attorney, Agent, or Firm* — Myers Bigel Sibley & Sajovec, P.A.

(57) ABSTRACT

The present invention relates to arrangements and methods for information relating to updates of a web page associated with a call dialog between the client that has a call set up with a further client via the telephony server, wherein the client comprises a telephony interface for managing at least one dialog and a browser for disclosing at least said web page. The method of the client comprises the steps of: receiving a first telephone signaling message, wherein the message comprises an address to said web page and a first identifier associated with the address of said web page, connecting to said web page, receiving a second telephone signaling message, wherein the message comprises executable code, a web page, or a link to a web page, and a first identifier associated with the address of the web page to be updated, mapping the executable code, a web page, or a link to the web page identified by the first identifier and updating said web page disclosed on the browser of the client by executing the executable code or showing the web page or following the link to the mapped web page.

18 Claims, 2 Drawing Sheets

METHODS AND ARRANGEMENTS IN A CLIENT AND TELEPHONY SERVER

TECHNICAL FIELD

The present invention relates to methods and arrangements in a client and a server. In particular, the present invention relates to a solution for updating a web page disclosed on the client.

BACKGROUND

Today there exist soft phones which are software based telephones on e.g. a PC. The soft phone comprises a telephony interface, which is a user interface for controlling telephony features e.g. making a call. There is a value in combining the telephony interface with a web browser, embedded in the soft phone, to create more advanced and user friendly services.

As an example, a user is having a voice conference with several participants. By using the web interface, the server can distribute information to the user via a web page disclosed on the client by means of the web browser. Such information may comprise a list of participants and who is currently speaking. To push the web page that displays this information, a method described in draft-ietf-sipping-app-interaction-framework-05 (www.ietf.org/internet-drafts/draft-ietf-sipping-app-interaction-framework-05.txt) can be used. This method enables a conference application to send a SIP (Session Initiation Protocol) REFER message to the user's terminal indicating which web page to display.

In order to be able to show who is currently speaking, the web page must be updated each time someone talks. This could be achieved by using existing solutions, such as HTTP server push technology, automatic browser refresh (which is a pull technology), or AJAX.

HTTP server push (e.g. a server initiated update sent to the client) is a technology used by Netscape based on a persistent HTTP connection between the client and the web server. Whenever the web server wants to update the client, it sends a new HTML document over the existing HTTP connection, i.e. the client is only updated when there is new information available.

Pull technology means that the client requests updated information from the web server with a predefined time interval between each request, e.g. once a minute. This means that there is always a delay before the client is updated. It also means that the client unnecessarily sends requests even when there is no updated information.

AJAX is a technology supported by leading browsers, e.g. Internet Explorer, Firefox/Mozilla and Opera. It enables a script in a web page to send an HTTP (HyperText Transfer Protocol) request to a web server that return XML formatted data. This data can contain e.g. the current speaker. The benefit of this is that the script in the browser need only update the part of the web page that should be changed (in this case the icon that indicates the current speaker). AJAX is combined with push or pull technology.

Unless AJAX is used, the whole page must be sent each time an update is needed, e.g. when the indication of who is talking should be updated, or another participant has joined the conference.

Pull technology is extremely resource consuming on the server and network, and there is always a delay before the client is updated with new information.

HTTP server push is generally not supported by browsers. If a conference application as discussed above should be offered to mobile users using a smart phone it would be unrealistic to require support for HTTP server push.

AJAX requires both an advanced web browser and web server. Only leading web browsers support this technology. Also, an embedded device often has a very limited web browser that most likely does not support AJAX. An "embedded device" is a piece of hardware containing a computer such as a phone, petrol pump, or cash point. If pull technology is used, the problems described earlier in conjunction the pull technology applies. If push technology is used this puts tough demands on the web server, that must support persistent TCP connections from each browser instance on all active devices. There is also a risk that the TCP connection from the browser to the web server is broken due to e.g. temporary lack of radio coverage.

The technology described in draft-ietf-sipping-app-interaction-framework-05 can not be used to update the user interface since there is no support for an asynchronous push. A new REFER request to the same user would create a new web browser rather than updating existing components.

SUMMARY

Thus, an object with the present invention is to achieve an improved solution for providing updated information from a web server.

This is achieved according to a first aspect of the present invention by means of a method for a telephony server for sending information relating to updates to a client of a web page associated with a call dialog between the client that has a call set up with a further client via the telephony server. The client comprises a telephony interface for managing at least one dialog and a browser for disclosing at least said web page, the method comprises the steps of sending a first telephone signaling message to the client, wherein the first message comprises an address to said web page and a first identifier associated with said web page, sending a second telephone signaling message to the client, wherein the message comprises executable code, a web page, or a link to a web page, and the first identifier associated with the web page to be updated such that the web page disclosed on one of the browser of the phone client can be updated by mapping the executable code, a web page, or a link to a web page identified by the first identifier and by executing the executable code or showing the web page or following the link to the mapped web page.

This is achieved according to a second aspect of the present invention by means of a method for a client for receiving information relating to updates from a telephony server of a web page associated with a call dialog between the client that has a call set up with a further client via the telephony server. The client comprises a telephony interface for managing at least one dialog and a browser for disclosing at least said web page, the method comprises the steps of receiving a first telephone signaling message, wherein the message comprises an address to said web page and a first identifier associated with the address of the web page, connecting to said web page, receiving a second telephone signaling message, wherein the message comprises executable code, a web page, or a link to a web page, and the first identifier associated with the address of the web page to be updated, mapping the executable code, a web page, or a link to the web page identified by the first identifier and updating said web page disclosed on the browser of the client by executing the executable code or showing the web page or following the link to the mapped web page.

This is achieved according to a third aspect of the present invention by means of a telephony server for sending information relating to updates to a client of a web page associated with a call dialog between the client that has a call set up with a further client via the telephony server, the client comprises a telephony interface for managing at least one dialog and a browser for disclosing at least said web page, the server comprises: output means for sending a first telephone signaling message to the client, wherein the first message comprises an address to said web page and a first identifier associated with the address of said web page, and for sending a second telephone signaling message to the client, wherein the message comprises executable code, a web page, or a link to a web page, and the first identifier associated with the web page to be updated such that the web page disclosed on one of the browser of the phone client can be updated by mapping the executable code, a web page, or a link to a web page identified by the first identifier and by executing the executable code or showing the web page or following the link to the mapped web page.

This is achieved according to a fourth aspect of the present invention by means of a client for receiving information relating to updates from a telephony server of a web page associated with a call dialog between the client that has a call set up with a further client via the telephony server, wherein the client comprises a telephony interface for managing at least one dialog and a browser for disclosing at least said web page, the client comprises input means for receiving a first telephone signaling message, wherein the message comprises an address to said web page and a first identifier associated with the address of the web page, the browser for connecting to said web page, input means for receiving a second telephone signaling message, wherein the message comprises executable code, a web page, or a link to a web page, and the first identifier associated with the address of the web page to be updated, a mapping unit for mapping the executable code, a web page, or a link to the web page identified by the first identifier and a processor for updating said web page disclosed on the browser of the client by executing the executable code or showing the web page or following the link to the mapped web page.

An advantage with embodiments of the present invention is that no resource consuming polling is performed since the client is notified of a change using telephony signaling, e.g. by means of a SIP INFO or NOTIFY.

A further advantage with embodiments of the present invention is that there are standardized parts of SIP that can be used for pushing data to the client, e.g. SIP REFER or INFO. The data can contain e.g. HTML code or JavaScript.

DETAILED DESCRIPTION

Figure 1:
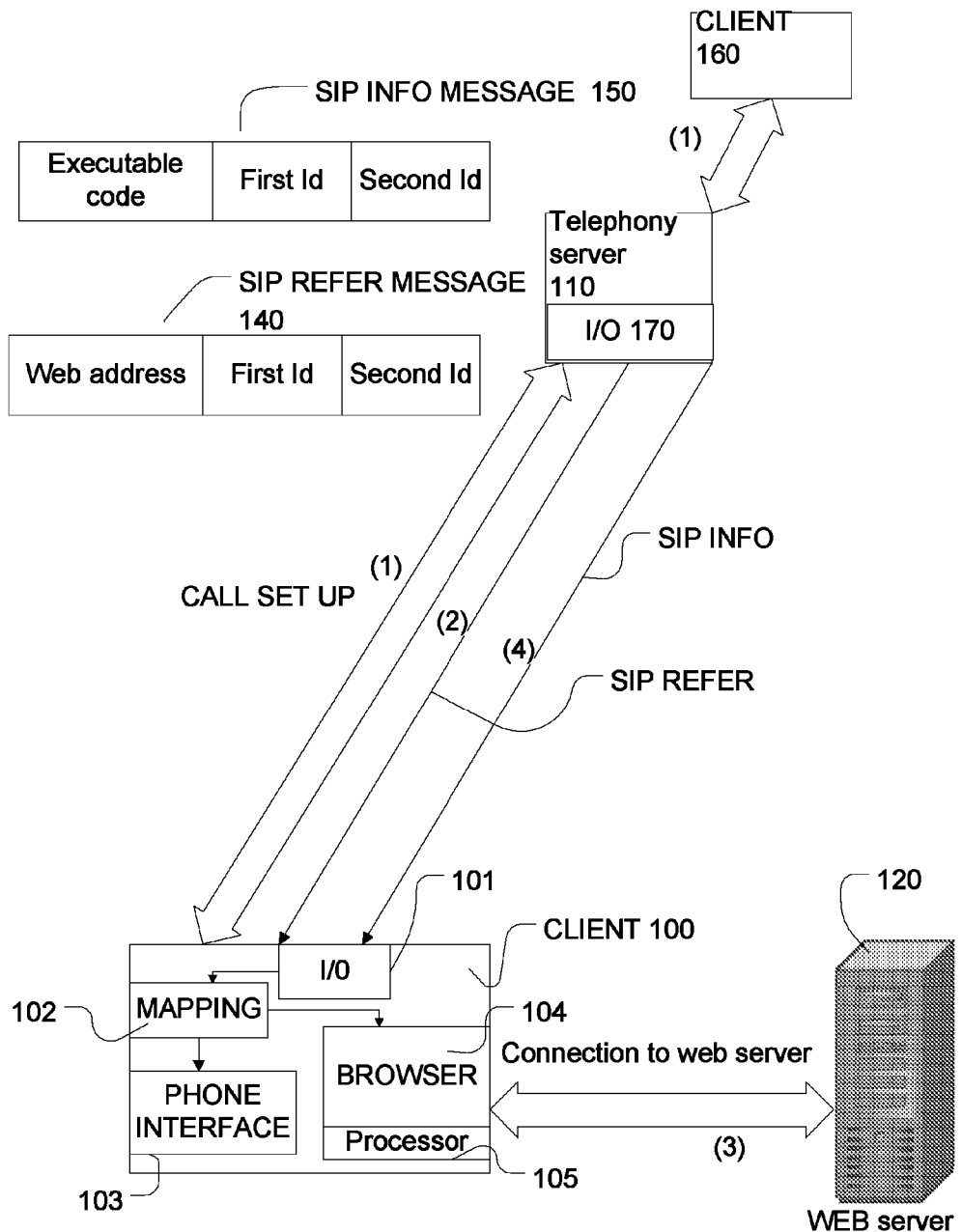
FIG. 1 illustrates an embodiment of the present invention.

The present invention relates to a client, also referred to as a phone client, and a server, also referred to as a telephony server in an IP network providing a telephone service. The present invention is e.g. applicable in an Internet Multimedia Subsystem (IMS) at a network operator or in an IP exchange installed at the customer. The client to be used in the method of the present invention comprises a telephony interface and a browser. The browser may be a web browser, a wap browser or any other browser able to show a graphical user interface based on a page sent by a server. The telephony interface can manage at least one dialog and the browser can preferably display multiple web pages. Each dialog may be associated with at least one web page. This client may be implemented in a laptop or PC.

The telephony server is a server that handles telephony signaling. An example of a telephony server is a SIP server. When a phone call is set up between two clients via a telephony server a connection to a web server is established by sending a first message, e.g. a SIP REFER message, to the phone client with the address to a web page (such as a link to the web page) to be able to show the web page. The first message comprises also a first identifier associated with the address of the web page and preferably also a second identifier associated with the telephone dialog. When the web page needs to be updated, the telephony server sends a second message, e.g. a SIP INFO or a SIP NOTIFY, comprising executable code, HTML code, or a link to the web page to the phone client. Said code or link is used to update the web page and further contact between the client and the web server is avoided. The second message comprises further the first identifier associated with the address of the web page and preferably also a second identifier associated with the telephone dialog. The SIP identity, Call-ID may be used for identifying the dialog. If the identifier associated with the address of the web page contained in the message is not in use, then the phone client opens up a new window/frame/tab and connects to the relevant web server and displays the web page. If the identifier is already used, the client updates the existing window/frame/tab associated with said identifier by e.g. executing the received code. The web page contains preferably information and services related to the call, e.g. a button for starting recording of the call, or a map showing the location of the person the user is talking to.

Thus, during the phone call the telephony server is able to push executable code, HTML code or a link to a web page to the client. This can be achieved by sending a SIP NOTIFY or SIP INFO message comprising executable code such as a JavaScript or a link to a JavaScript, HTML code or a link to a web page. The code is mapped to an existing phone call using the identifier associated with the address to the web page. The web page belonging to this specific call can then be updated accordingly. If an identifier for identifying the dialog is used in the first and second messages, then said identifier may also be used for mapping the code to an existing call and more than one web page may be associated with one dialog.

An embodiment of the present invention is described in conjunction with FIG. 1.

(1) A call is set up between a first client 100 and a second client 160 via the server by means of a call-set-up procedure. A dialog is created during this procedure.

(2) The telephony server may use a SIP REFER message 140 to carry the information regarding the address to the web page and a first identifier associated with the address of the web page.

(3) A connection to a web server providing the web page that provides information relating to the call is established.

(4) When the web page needs to be updated a second message is transmitted from the server to the client comprising e.g. executable code and the identifier associated with the web page.

The client 100 comprises a telephony interface 103 for managing at least one dialog and a web browser 104 for disclosing at least one web page. Each dialog may be associated with at least one web page. The server 120 comprises output means for sending telephone signaling messages, e.g. in connection with call set up, and the client comprises input means 101 for receiving telephone signaling messages such as the above described first and second messages 140, 150. The second message 150 comprising executable code, HTML code or a link to a web page, a first identifier associated with the address of the web page may be a SIP NOTIFY or a SIP INFO message. The client comprises a mapping unit 102 for mapping the executable code, HTML code or link to the web page to be updated by using the first identity, and a processor 105 for executing the code, showing the HTML-code as a web page or the web page by following the link to update the web page.

Preferably, the second message 150 comprising executable code, HTML code or a link to a web page and the first identifier comprises further a second identifier associated with the dialog. The second identifier may be used to map the code to the relevant web page when more than one web pages are associated with one dialog and more than one dialog is running.

Figure 2:
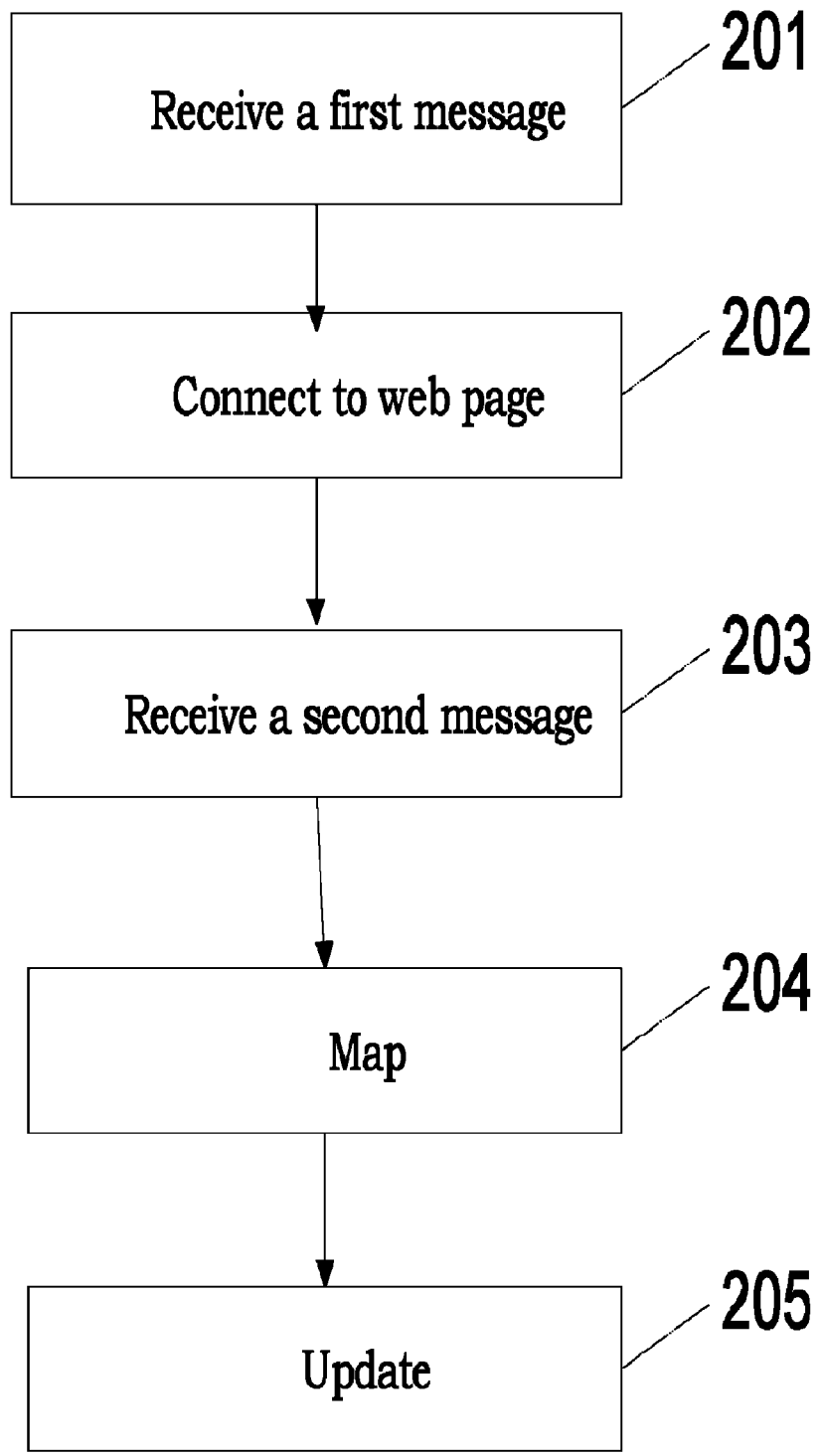
FIG. 2 is a flowchart of a method according to an embodiment of the present invention.

FIG. 2 is a flowchart of the method according to one aspect of the present invention. The method comprises the steps of:

201. Receive a first telephone signaling message, wherein the message comprises an address to said web page and an identifier associated with the address of the web page.

202. Connect to said web page.

203. Receive a second telephone signaling message, wherein the message comprises executable code, a web page, or a link to a web page, and a first identifier associated with the address of the web page to be updated.

204. Map the executable code, a web page, or a link to the web page identified by the first identifier and

205. Update said web page disclosed on the browser of the client by executing the executable code or showing the web page or following the link to the mapped web page.

As stated above there is a risk that the TCP connection from the browser to the web server is broken due to e.g. temporary lack of radio coverage for the AJAX solution when it is used together with push technology. This is not a problem for the solution according to the present invention since it relies on SIP, which is inherently resilient to these types of problems. The difference between using AJAX and the method described in the present invention is that AJAX relies on an advanced browser and almost all program logic is performed inside the web browser, i.e. it's a JavaScript inside the browser that makes the AJAX request for updating e.g. the list of conference participants or who is currently speaking. The method described in the present invention on the other hand relies on a much simpler browser (it need not even be a web browser) and using the same example as above, it would be the softphone itself that programatically instructs the browser to update e.g. the participant list. The benefit of this is that the browser is in most cases a sourced component used in the softphone, and if it lacks AJAX support there is no way for anyone except the owner of the web browser to add this function.

By using the present invention, a server is able to communicate with the user (i.e. offer a service and to receive requests) without participation from the client. Traditionally in IP telephony, the client comprises logic that is tailor made for the offered service. A disadvantage, is that the software on the client has to be updated each time a new service is offered. By using the present invention, the client does not need to understand the service since, the client is only required to be able to show the web page in connection with a dialog.

The present invention may be useful when providing information relating to the status of a user's cash card, or when providing a link for recording the call.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method, performed by a telephony server, for sending information relating to updates to a client of a web page associated with a call dialog between the client that has a call set up with a further client via the telephony server, the client comprises a telephony interface for managing at least one dialog and a browser for disclosing at least said web page, the method comprising:
   sending a first telephone signaling message to the client, where the first telephone signaling message comprises an address to said web page and a first identifier associated with said web page; and
   sending a second telephone signaling message to the client, where the second telephone signaling message comprises executable code, a web page, or a link to a web page, and the first identifier associated with the web page to be updated such that the web page disclosed on the browser of the client can be updated by mapping the executable code, a web page, or a link to a web page identified by the first identifier and by executing the executable code or showing the mapped web page or obtaining information using the link to the mapped web page,
   where the first and second telephone signaling messages further comprise a second identifier associated with the dialog, and where the second identifier is used for the mapping.

2. The method according to claim 1, where the first telephone signaling message is a Session Initiation Protocol (SIP) REFER message.

3. The method according to claim 1, where the second telephone signaling message is a Session Initiation Protocol (SIP) NOTIFY or a SIP INFO message.

4. The method according to claim 1, where the executable code is a JavaScript code.

5. The method according to claim 1, where the second identifier is a Session Initiation Protocol (SIP) Call-Id.

6. The method, performed by a client, for receiving information relating to updates from a telephony server of a web page associated with a call dialog between the client that has a call set up with a further client via the telephony server, where the client comprises a telephony interface for managing at least one dialog and a browser for disclosing at least said web page, the method comprising:
   receiving a first telephone signaling message, where the first telephone signaling message comprises an address to said web page and a first identifier associated with the address of the web page,
   connecting to said web page,
   receiving a second telephone signaling message, where the second telephone signaling message comprises executable code, a web page, or a link to a web page, and the first identifier associated with the address of the web page to be updated,
   mapping the executable code, a web page, or a link to the web page identified by the first identifier, and
   updating said web page disclosed on the browser of the client by executing the executable code or showing the mapped web page or obtaining information using the link to the mapped web page,
   where the first and second telephone signaling messages further comprise a second identifier associated with the dialog, and where the mapping includes using the second identifier for the mapping.

7. The method according to claim 6, where the first telephone signaling message is a Session Initiation Protocol (SIP) REFER message.

8. The method according to claim 6, where the executable code is a JavaScript code.

9. The method according to claim 6, where the second identifier is a Session Initiation Protocol (SIP) Call-ID.

10. A telephony server for sending information relating to updates to a client of a web page associated with a call dialog between the client that has a call set up with a further client via the telephony server, the client comprises a telephony interface for managing at least one dialog and a browser for disclosing at least said web page, the server comprising:
   first output circuitry for sending a first telephone signaling message to the client, where the first telephone signaling message comprises an address to said web page and a first identifier associated with the address of said web page, and
   second output circuitry for sending a second telephone signaling message to the client, where the second telephone signaling message comprises executable code, a web page, or a link to a web page, and the first identifier associated with the web page to be updated such that the web page disclosed on the browser of the client can be updated by mapping the executable code, a web page, or a link to a web page identified by the first identifier and by executing the executable code or showing the mapped web page or obtaining information using the link to the mapped web page,
   where the first and second telephone signaling messages further comprise a second identifier associated with the dialog, and where the second identifier is used for the mapping.

11. The server according to claim 10, where the first telephone signaling message is a Session Initiation Protocol (SIP) REFER message.

12. The server according to claim 10, where the second telephone signaling message is a Session Initiation Protocol (SIP) NOTIFY or a SIP INFO message.

13. The server according to claim 10, where the executable code is a JavaScript code.

14. The server according to claim 10, where the second identifier is a Session Initiation Protocol (SIP) Call-ID.

15. A client for receiving information relating to updates, from a telephony server, of a web page associated with a call dialog between the client that has a call set up with a further client via the telephony server, where the client comprises a telephony interface for managing at least one dialog and a browser for disclosing at least said web page, the client comprising:
   input circuitry for receiving a first telephone signaling message, where the first telephone signaling message comprises an address to said web page and a first identifier associated with the address of the web page,
   further input circuitry for receiving a second telephone signaling message, where the second telephone signaling message comprises executable code, a web page, or a link to a web page, and the first identifier associated with the address of the web page to be updated,
   a mapping unit for mapping the executable code, a web page, or a link to the web page identified by the first identifier, and
   a processor for updating said web page disclosed on the browser of the client by executing the executable code or showing the mapped web page or following the obtaining information using the link to the mapped web page,
   where the first and second telephone signaling messages further comprise a second identifier associated with the dialog, and where the mapping unit uses the second identifier for the mapping.

16. The client according to claim 15, where the message is a Session Initiation Protocol (SIP) REFER message.

17. The client according to claim 15, where the executable code is a JavaScript code.

18. The method according to claim 15, where the second identifier is a Session Initiation Protocol (SIP) Call-ID.

* * * * *